Figure 1:
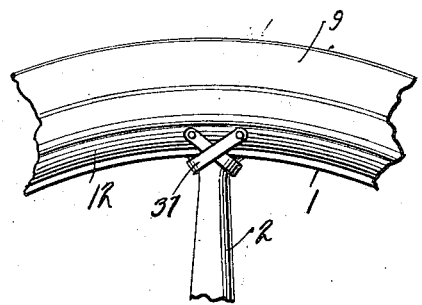

D. W. SKOGSBERGH.
PUNCTURE PROOF AUTO TIRE.
APPLICATION FILED JAN. 22, 1918.

1,322,636.
Patented Nov. 25, 1919.

WITNESSES
W. C. Fielding.

INVENTOR
David. W. Skogsbergh
BY
ATTORNEY

UNITED STATES PATENT OFFICE.

DAVID W. SKOGSBERGH, OF CHICAGO, ILLINOIS.

PUNCTURE-PROOF AUTO-TIRE.

1,322,636.  Specification of Letters Patent.  Patented Nov. 25, 1919.

Application filed January 22, 1918. Serial No. 213,207.

*To all whom it may concern:*

Be it known that I, DAVID W. SKOGSBERGH, a citizen of the United States, residing at Chicago, in the county of Cook and State of Illinois, have invented certain new and useful Improvements in Puncture - Proof Auto-Tires, of which the following is a specification.

This invention relates to automobile tires and has for its object the production of a simple and efficient means for resiliently supporting the tread portions of a metallic tire.

Another object of this invention is the production of a simple and efficient resilient tire of the pneumatic type, wherein the tread portion thereof is efficiently reinforced in such a manner as to present a puncture proof tread.

With these and other objects in view this invention consists of certain novel constructions, combinations and arrangements of parts as will be hereinafter fully described and claimed.

Figure 2:
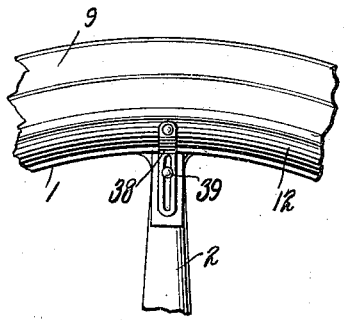
Figure 3:
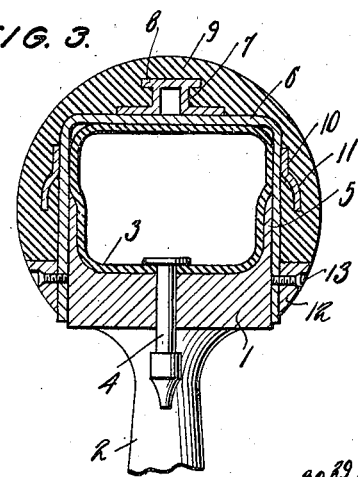
Figure 4:
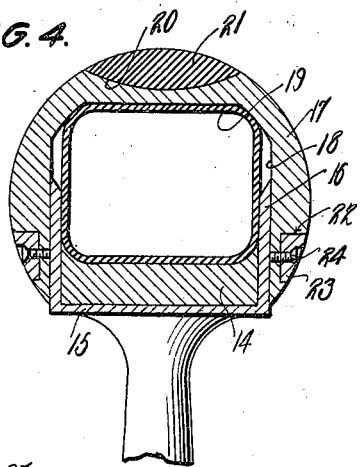
Figure 5:
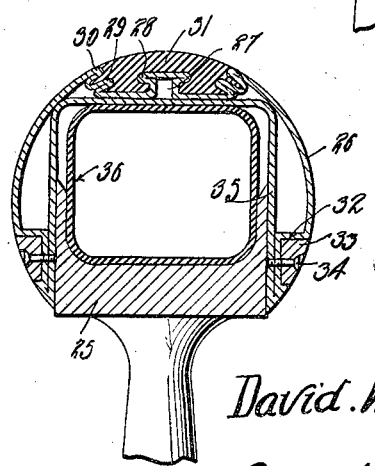

In the drawings:

Figure 1 is a side elevation of a portion of the tire shown mounted upon a wheel rim, Fig. 2 is a side elevation of a portion of a tire mounted upon a wheel rim, showing the modified form of connecting the tire in engagement with the spokes, Fig. 3 is a vertical section taken through the automobile tire showing one form thereof, Fig. 4 is a vertical transverse section through a modified form of a tire, Fig. 5 is a transverse vertical section through a still further modified form of the tire which may be used in carrying out the present invention.

By referring to the drawings it will be seen that 1 designates the rim of the wheel which is supported upon the usual spokes 2. The rim carries a pneumatic tube 3 upon the outer face thereof and this tube 3 is connected to a suitable air supply valve 4 for the purpose of facilitating the entrance of air into the tube 3. The rim 1 is provided with a plurality of side flanges 5, which flanges 5 extend along the sides of the tube 3 for the purpose of firmly holding the tube 3 against lateral movement upon the rim.

An outer tread plate 6 is slidably mounted upon the rim 1 and this tread plate 6 is substantially U-shaped in cross section as shown clearly in Fig. 3 of the drawing. The tread plate 6 is slidably mounted upon the rim 1 and is adapted to move thereon for the purpose of permitting the tread plate 6 to move under the yieldable action of the inner tube 3, the inner tube 3 engaging the inner face of the tread plate 6 as clearly shown in Fig. 3 of the drawings. This tread plate 6 is provided with an outer covering retaining rib 7 upon the outer face thereof, and this rib 7 is provided with a plurality of laterally extending flanges 8 upon the side edges thereof for the purpose of permitting the outer covering 9 to fit snugly therearound. By having the covering 9 fitting snugly around the edges of the rib 7, it will be seen that the covering 9 will be firmly held in engagement with the tread plate 6. This tread plate 6 is also provided with a plurality of eye retaining plates 10 as shown in Fig. 3 and these retaining plates 10 are provided with outwardly spaced lower flanges 11, which flanges 11 are embedded within the outer covering 9 for the purpose of facilitating the holding of the outer covering 9 in engagement with the tread plate 6.

The outer cover 9 carries a pair of securing bands 12 upon the side edges thereof, and these bands 12 are secured to the side plates of the tread plates 6 by means of suitable securing screws 13. In this way, the inner ends of the covering 9 may be firmly held in engagement with the inner ends of the tread plate 6. This structure will be clearly understood by carefully considering Fig. 3 of the drawings.

It of course should be understood that the metallic portions of the tire may be either formed of pressed steel or may be formed of sheet metal, or in fact may be formed of any suitable or desired material without departing from the spirit of the invention.

In the structure shown in Fig. 4 of the drawings, a rim 14 is provided, which rim 14 is surrounded by means of a rim plate 15, the rim plate 15 having outwardly extending flanges 16. An outer metallic tread section 17, which is substantially U-shaped in cross section fits over the side flanges 16 and extends outwardly with respect thereto for the purpose of producing the pocket 18 within which pocket 18 is mounted the pneumatic inner tube 19. This inner tube may be connected with a suitable valve for the purpose of permitting air to be inserted into the tube 19. The outer tread section 18 is provided with a substantially concaved pocket 20 upon the outer face thereof, and a yieldable tread such as a rubber strip 21 is placed within the concaved pocket 20 for the purpose of producing a cushioning tread or soft tread upon the outer periphery of the tread section 17.

The tread section 17 is provided with a longitudinally extending, or circumferentially extending groove channel 22 near each of the inner edges thereof and a retaining block 23 is seated within each groove 22 and extends around the entire circumference of the tire tread section 17. These blocks or bands 23 are securely held in engagement with the tread section 17 by means of suitable screws 24 shown in Fig. 4 of the drawings.

In Fig. 5 there is shown a still further embodiment of the present invention or modified form thereof, wherein the entire metallic portion thereof is formed of sheet metal. It of course should be understood that when the device is formed of sheet metal, a very light and cheaply constructed device has been produced. In the structure shown in Fig. 5 illustrating the pressed steel tire construction, it should be understood that the entire device, that is to say the metal parts thereof are preferably formed from steel which is pressed into the desired shape.

In the form shown in Fig. 5 a rim 25 is employed and an outer tread section 26 is slidably mounted upon the rim 25. This tread section 26 is preferably struck from sheet steel and comprises a circumferentially extending rib 27 formed upon the outer tread portion thereof, the rib 27 being provided with laterally folded rib or flange portions 28. The side edges of the tread section 26 are bent or folded to produce a clencher flange 29 and an overhanging retaining flange 30 extending around each side edge of the tread section 26. These clencher flanges 29 and overhanging flanges 30 are adapted to constitute, in conjunction with the flanges or folded portions 28, an efficient retaining means for the yieldable tread portions 31, which is supported upon the outer end of the tread section 26. The tread section 26 is provided upon the inner side edges thereof with a socket portion 32 which is formed by pressing a substantially U-shaped channel near the edge of the tread section 26 and a suitable retaining block or band 33 is mounted within this channel 32. The band 33 is firmly held in engagement with the tread section 26 by means of suitable screws 34. These screws 34 also pass through the inner retaining plate or guiding plate 35 which comprises a portion of the tread section 26, the inner retaining plate 25 extending entirely across the under face of the tread portion of the tread section 26.

A suitable pneumatic tube 36 is carried by the rib 25 and is interposed between the rib 25 and the inner face of the inner plate 35 of the tread section 26. A plurality of anchoring yokes or straps 37 may be secured to the bands 12, 23 or 33 and these yokes plates or straps 37 are adapted to be crossed as shown in Fig. 1 and straddle around the spokes 2, in this way firmly holding the bands which are carried by the tread section of the tire against circumferential movement, upon the rim which supports the same.

In Fig. 2 there is shown a modified form of the device for anchoring the band against longitudinal or circumferential movement, and this anchoring means comprises a slotted plate 38, the slotted plate receiving a guiding pin 39 carried by the spoke 2. This plate 38 is secured to one of the bands for the purpose of anchoring the band against circumferential movement.

From the foregoing description it will be seen that a very simple and efficient yieldable or resilient tire has been produced which will be puncture proof due to the fact that the inner tube mounted within the tread section of the tire will be efficiently protected and reinforced by means of the metallic plate extending across the tread or outer portion thereof. It of course should be understood that certain obvious detail mechanical changes may be made in the present device without departing from the spirit of invention, so long as these changes fall within the scope of the appended claim.

What is claimed is:

A tire comprising a tread section, a rim section, said tread section being mounted upon said rim section, said tread section comprising an inner substantially U-shaped sheet metal wall in cross section, an outer wall having the sides thereof struck on the arc of a circle and provided with means along the inner edges thereof for facilitating the securing of said tread section against accidental displacement from the rim section, the outer wall of said tread section having the outer ends thereof projecting beyond the outer ends of the inner wall and formed to produce a pocket, the outer portion of the outer wall intermediate the sides thereof resting flat upon the outer portion of the inner wall, said pocket adapted to receive a tread cushion and means for yieldably supporting the tread section upon the rim section.

In testimony whereof I affix my signature in presence of two witnesses.

DAVID W. SKOGSBERGH.

Witnesses:
WILLIAM F. RITTER,
ORVIL NELSON.